United States Patent
Porikli et al.

(10) Patent No.: US 9,639,748 B2
(45) Date of Patent: May 2, 2017

(54) METHOD FOR DETECTING PERSONS USING 1D DEPTHS AND 2D TEXTURE

(71) Applicant: Mitsubishi Electric Research Laboratories, Inc., Cambridge, MA (US)

(72) Inventors: Fatih Porikli, Watertown, MA (US); Mehmet Kocamaz, Newark, DE (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 273 days.

(21) Appl. No.: 13/897,517

(22) Filed: May 20, 2013

(65) Prior Publication Data

US 2014/0341421 A1    Nov. 20, 2014

(51) Int. Cl.
  *G06K 9/00* (2006.01)
  *G06K 9/46* (2006.01)
  *G06K 9/62* (2006.01)

(52) U.S. Cl.
  CPC ....... *G06K 9/00369* (2013.01); *G06K 9/4642* (2013.01); *G06K 9/6269* (2013.01); *G06T 2207/10028* (2013.01); *G06T 2207/30196* (2013.01)

(58) Field of Classification Search
  None
  See application file for complete search history.

(56) References Cited

U.S. PATENT DOCUMENTS

| | | | |
|---|---|---|---|
| 2004/0143580 A1* | 7/2004 | Chi | G06F 17/3071 |
| 2010/0238160 A1* | 9/2010 | Yea | G06T 3/0093 345/419 |
| 2011/0013805 A1* | 1/2011 | Okada | G06K 9/00375 382/103 |
| 2011/0026770 A1* | 2/2011 | Brookshire | G05D 1/0251 382/103 |

(Continued)

OTHER PUBLICATIONS

Premebida, Cristiano, Oswaldo Ludwig, and Urbano Nunes. "LIDAR and vision-based pedestrian detection system." Journal of Field Robotics 26.9 (2009): 696-711. 16 pages.*

(Continued)

*Primary Examiner* — Sumati Lefkowitz
*Assistant Examiner* — Ryan P Potts
(74) *Attorney, Agent, or Firm* — Gene Vinokur; James McAleenan; Hironori Tsukamoto

(57) ABSTRACT

A method detects an object in a scene by first determining an active set of window positions from depth data. Specifically, the object can be a person. The depth data are acquired by a depth sensor. For each, window position perform the following steps. Assign a window size based on the depth data. Select a current window from the active set of window positions. Extract a joint feature from the depth data and texture data for the current window, wherein the texture data are acquired by a camera. Classify the joint feature to detect the object. The classifier is trained with joint training features extracted from training data including training depth data and training texture data acquired by the sensor and camera respectively. Finally, the active set of window positions is updated before processing the next current window.

18 Claims, 3 Drawing Sheets

(56) References Cited

U.S. PATENT DOCUMENTS

| | | | |
|---|---|---|---|
| 2011/0052004 A1* | 3/2011 | Lee | G06K 9/00221 |
| | | | 382/103 |
| 2011/0176000 A1* | 7/2011 | Budge et al. | 348/143 |
| 2013/0011046 A1* | 1/2013 | Choi | G06T 7/0051 |
| | | | 382/154 |

OTHER PUBLICATIONS

Julien Moras, Véronique Cherfaoui, Philippe Bonnifait. "A lidar Perception Scheme for Intelligent Vehicle Navigation." 11th International Conference on Control, Automation, Robotics and Vision, Dec. 2010, Singapour, Singapore. 7 pages.*

Lai, Kevin, et al. "Sparse distance learning for object recognition combining rgb and depth information." Robotics and Automation (ICRA), 2011 IEEE International Conference on. IEEE, 2011. 8 pages.*

Martin, David R., Charless C. Fowlkes, and Jitendra Malik. "Learning to detect natural image boundaries using local brightness, color, and texture cues." Pattern Analysis and Machine Intelligence, IEEE Transactions on 26.5 (2004): 530-549. 21 pages.*

Wojek, Christian, and Bernt Schiele. "A performance evaluation of single and multi-feature people detection." Joint Pattern Recognition Symposium. Springer Berlin Heidelberg, 2008. 10 pages.*

Felzenszwalb, Pedro, David McAllester, and Deva Ramanan. "A discriminatively trained, multiscale, deformable part model." Computer Vision and Pattern Recognition, 2008. CVPR 2008. IEEE Conference on. IEEE, 2008. 8 pages.*

\* cited by examiner

1: Inputs: $L = (d_1, \ldots, d_n)$ range scan points, $T$, $\mathcal{T}$, $h$
  * Compute $L_T$ by $L_T : T(L)$
2: for k=1, ..., n (all points in $L_T$)
3:   * Scale search window $W$ by $1/d_k$
4:   * Compute geometric descriptor $f^{1D} = [d_1, \ldots, d_m]^T$ inside $W$ using Eqs. 1-5
5:   * Determine, $\Delta y_j$, vertical jump offsets from $d_k$
6: for each $\Delta y_j$ for $W$
7:   * Compute HOG $f^{2D} = [v_1, \ldots, v_m]^T$
8:   * Normalize $f^{1D}$ and $f^{2D}$
9:   * Concatenate $f^{1D}$ and $f^{2D}$ to $f = [f^{1D} \; f^{2D}]^T$
10:  * Compute $h(f) = \sum_{i=1}^{m} \alpha_i exp(-\gamma \|f - f_i^*\|^2)$
11:  * if $h(f) > 0$ detect human, remove underlying points from $L_T$

*Fig. 2*

METHOD FOR DETECTING PERSONS USING 1D DEPTHS AND 2D TEXTURE

FIELD OF THE INVENTION

This invention relates generally to computer vision, and more particular to detecting humans in a scene.

BACKGROUND OF THE INVENTION

Detecting humans in scenes is beneficial in a number of computer vision applications. Human detection is difficult because of internal and external factors, internal factors include illumination variations, insufficient lighting, saturation due to bright lights such as headlights and floodlights, shadows, reflections, weather conditions, scene clutter, other objects, imaging noise and the fidelity of the acquired data. External factors relate to articulated body parts that can move, rotate, and deform and take on different shapes and silhouettes. Humans can stand, lie, walk, run, bend and make other body gestures. Appearance, e.g., height, weight, clothing, etc., differ significantly from one human to another. In addition, the human body has various poses at distinct viewpoints. All of these factors make human detection difficult when compared with rigid objects.

Human detection methods can be categorized in two groups based on the modality of the input data.

Human Detection

Two types of sensors can be used for human detection: visual sensors, such as monocular cameras, and sensors that provide 3D geometric cues, such as one or multi-layer light detection and ranging (LIDAR), and motion detectors. The detectors acquire an input image, determine descriptors for portions (windows) of the image. The descriptors are used by a classifier to determine whether there is a human in any windows, or not.

One method uses Haar wavelets to construct the descriptors and to train multiple linear support vector machines (SVMs). Another method uses a histogram of oriented gradients (HOGs). A rejection cascaded and AdaBoosted classifier can be used with the HOGs to achieve real-time performance. Covariance features (COV) are also known, and a classifier can be based on, an underlying Riemannian manifold. Those holistic methods achieve remarkable results, except for occlusions.

Alternatively, detection can be done by identifying human body parts and their common shapes. In those methods, local features for body parts are determined and combined to form human models. Human silhouette information can also take into account to handle the occlusions. However, performance highly depends on the image resolution for the human body parts.

Detectors use geometric cues to extract features from 3D or range scan data. For example, oriented filters can be applied to spatial depth histograms. Instead of a classifier, a simple threshold operation can be performed to detect humans. Another method converts depth images to 3D point clouds. A dictionary is constructed from geodesic local interest points in another method. That method has a high detection rate as long as humans are not occluded and in contact with other objects.

Another method uses a large feature vector of histograms of local depth information to represent humans. That method handles occlusions, but it is computationally complex and not suitable for real time applications.

Another method uses a LIDAR scan to form a leg descriptor. That method extracts a number of predefined features from segmented line parts and trains classifiers. The method can detect humans when there are no occlusions, and the legs are visible, and the LIDAR is directed at the legs. That method strictly and explicitly requires the LIDAR scan to hit at the leg level to detect humans.

SUMMARY OF THE INVENTION

The embodiments of the invention provide a method for accurately detecting humans in real time. The method combines 1D depth from range scans and 2D texture from images via a geometric descriptor, and a silhouette based visual representation within a radial basis function kernel support vector machine (SVM) learning framework. Combining multiple modalities increases the detection accuracy and reduces the computational time. In contrast with the prior art, the method does not make any restrictive assumptions on the range scan positions, thus the method applicable to a wide range of real-life detection tasks.

The method integrates photometric and range scan features obtained from both data modalities in a single joint classifier. The method is accurate under difficult and varying environmental conditions. Unlike the prior art, the method can detect humans even when the range scan intersects the upper torso and head of the body without making any assumptions about the visibility of the legs. This is critical for real world applications.

BRIEF DESCRIPTION OF THE DRAWINGS

FIG. 2 is pseudocode for the method of FIG. 1; and

DETAILED DESCRIPTION OF THE PREFERRED EMBODIMENTS

Figure 1:
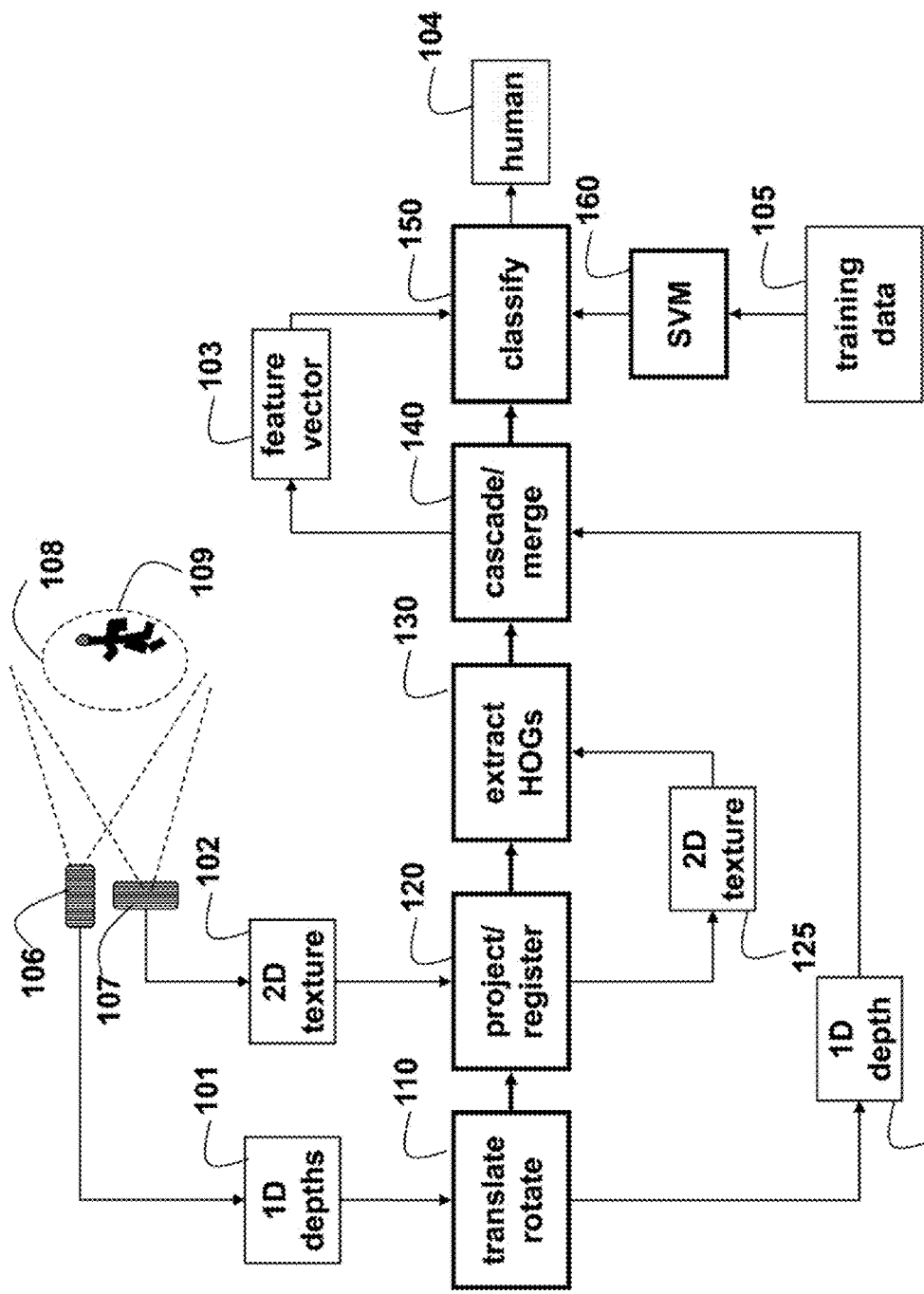
FIG. 1 is a flow diagram of a method for detecting humans in a scene according to embodiments of the invention.

The embodiments of our invention provide a method for accurately detecting objects, e.g., humans 109 in a scene 108 in real time. To take advantage of the geometric (depth) and visual (texture) data, our multi-modal human detector combines one-dimensional (1D) range scan data and two-dimensional (2D) image data into a single joint feature. Thus, the detector operates on a joint higher-dimensional feature space. Although this description uses a human as an example object, it should be understood that the invention can also be worked with other complex objects, such as animals, moving robots, articulated machines, vehicles and the like.

As shown, input to the method includes 1D depth data 101 and two-dimensional 2D texture data 102 acquired of the scene. The 1D depth data can be acquired by a depth sensor or scanner 106, and the texture data with camera 107.

The depths are rotated 110, translated 120, and then projected and registered 130 with the textures to produce registered data 125. Histograms of gradients (HOGs) are extracted 130, cascaded and merged 140 to produce a joint feature vector 103 which is classified 150 according to a support vector machine (SVM) 160 constructed from training data 105 to determine whether the scene includes a human 104.

FIG. 2 shows the pseudocode for the method. All of the variables are described in detail below. The steps of the method and any other procedures described herein can be performed in a processor connected to memory and input and output interface as known in the art.

Training

Figure 3:
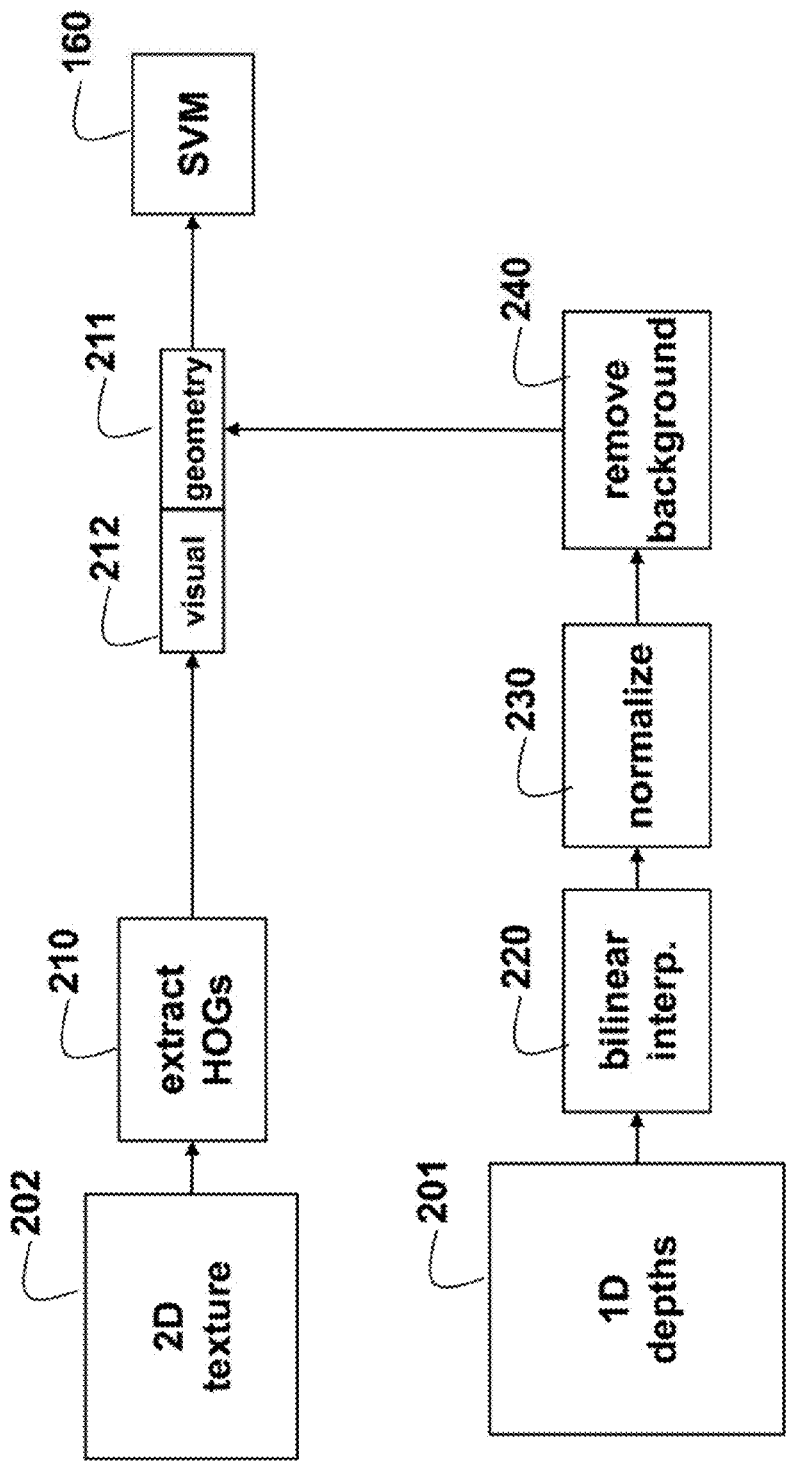
FIG. 3 is a flow diagram for training a single joint classifier for the detection method of claim 1.

FIG. 3 shows training the SVM used by the classifier. For a window $W_i$ in a texture image data 202, corresponding 1D range scan data $L_i=(d_1, \ldots, d_{m_i})$ 201 can be acquired with Light Detection and Ranging (LIDAR) or from a depth camera. In case of the LIDAR sensor, there is a single, horizontal, synchronously acquired range scan segment within the window. The depth camera, on the other band, can provide multiple horizontal range scan segments, which are particularly valuable for training. The depth d is the distance from the sensor to a point in the scene, in camera normal direction.

Geometric Descriptor

Our geometric descriptor $f^{1D}$ 211 applies to every part of the human body. The descriptor is obtained by the following procedure.

1) Depending on the size and depth of the human objects, range scans $L_i$ for positive samples form arbitrary length vectors $$f_i^{1D}=[d_1, \ldots, d_{m_i}]_i^T, 1 \leq m_i \leq \max(\|w_W\|), \quad (1)$$

where $\|w_W\|$ is the width of the window. To map the arbitrary length feature vectors onto a uniform, fixed dimensional feature space $R^m$, an m-point bilinear interpolation $B_m$ is performed 220 on $f_i^{1D}$. After the interpolation, the dimensionality of $f_i^{1D}$, that is $m_i$, becomes m $$f_i^{1D}=[d_1, \ldots, d_m]_i^T \leftarrow B_m(f_i^{1D}). \quad (2)$$

2) The distance between the sensor arrangement and the humans differs significantly in the scene. Therefore, we normalize 230 the depths. To compensate tier this distance, the closest point depth, $d_C$, in $f_i^{1D}$ to the sensor is determined. Then $d_C$ is subtracted from $f_i^{2D}$.

$$d_C = \min(d_1, \ldots, d_m), d_C \neq 0 \quad (3)$$

$$f^{1D} \leftarrow f^{1D} - d_C = [d_1 - d_C, \ldots, d_m - d_C]^T. \quad (4)$$

3) Background clutter, as well as other objects in the scene, can be at different distances from the humans. This causes considerable geometric feature variation around the silhouette of the human body. Acquiring all this variation in the training data would be one approach. Yet, this requires a huge amount of training data, which would be impractical. This can also cause classifier failure due to the weakening of the descriptor's discriminative power. Therefore, we remove 240 the background.

Therefore, the depth values of the feature vector elements that are above a human shape threshold are removed. The threshold, $d_H$, is set to the maximum possible radius of human objects. If a point in the feature vector $f^{1D}$ has a depth value larger than the threshold, the point is set to the maximum radius. As a result, the variation due to the other objects and background clutter are eliminated according to $$d_k = \begin{cases} d_H & \text{if } d_k \geq d_H \\ d_k & \text{otherwise} \end{cases}. \quad (5)$$

Visual Descriptor

Due to its shape representation ability, computational simplicity, and illumination changes. Histograms of Oriented Gradient (HOG) are extracted 210 from the texture image data to form the visual part 212 of the descriptor $f^{2D}=[v_1, \ldots, v_n]^T$. The HOGs can represent efficiently the local appearance by a distribution of edge gradients in a cell within an image region. These cells, either overlapping or on a regular grid, are smaller components of the windows. Within a cell, a histogram is obtained, and these local cell histograms are concatenated into a larger descriptor for the window. All cell histograms of the window descriptor are normalized using accumulated energy within the window for additional accuracy with changing illumination. Conventionally, energy is a measure of the amount of "information" or complexity in an image.

Similarly, other discriminative descriptors such as region covariance descriptor (COV), co-occurrence matrix coefficients, histograms of local binary and ternary patterns and n-tuples are used in embodiments of the method.

Combined Descriptor & Classifier Training

The geometric $f^{1D}$ and visual $f^{2D}$ features are concatenated in the same joint feature vector to form the multi-modal human descriptor $f$. The raw geometric and visual feature vectors have different dimensions, thus their individual contributions in the multi-modal descriptor are not balanced. To overcome this issue, individual vectors are normalized to a unit norm:

$$f^{1D} \leftarrow \frac{f^{1D}}{\sum_{k=1}^{m} d_k}, \quad (6)$$

and $$f^{2D} \leftarrow \frac{f^{2D}}{\sum_{k=1}^{n} v_k}. \quad (7)$$

The combined descriptor in $R^{m+n}$ is $f=[f^{1D} \ f^{2D}]^T$.

During training, the negative samples are selected from windows without objects because the window size changes according to the depth value of the window center, the size variation of the negative samples comes naturally.

We use a support vector machines (SVMs) for our classifier. SVMs fit a hyperplane between positive and negative training samples in the feature space. The decision boundary is defined by a set of support vectors that separate the positive and negative samples in a maximum margin. The decision function of SVM is $$h(f) = \sum_{i=1}^{m} \alpha_i [\phi(f) \cdot \phi(f_i^*)], \quad (8)$$

where $\alpha_i$ are the weight of the corresponding m support vectors $f^*_i$ and $\phi$ is a mapping function to a space $\mathcal{H}$. The dot products in the decision function can be replaced by a kernel function $$k(f, f^*_i) = \phi(f) \cdot \phi(f^*_i). \quad (9)$$

By using, the kernel function, the classifier becomes a hyperplane in $\mathcal{H}$, which can be non-linear in the input space. For given a set of labeled samples $(x_i, y_i)$, where the labels $y_i = \{-1, 1\}$, the learning problem of SVM can be formulates as the minimization of $$\min_{w, \varepsilon, b} \frac{1}{2}\|w\|^2 + C \sum_{i=1}^{m} \varepsilon_i \quad (10)$$

subject to $$y_i(w \cdot f_i - b) \geq 1 - \epsilon_i, \epsilon_i \geq 0, \quad (11)$$

where $\epsilon_i$ is a penalty for misclassified samples. The above optimization tries to classify as many training sample as possible correctly. Also the minimization of $\|w\|$ makes the margin as large as possible, and C is a variable term to set the relative influence.

We use the radial basis function (RBF) as the kernel function of SVM $$\phi(f)\cdot\phi(f^*_i)=\exp(-\gamma\|f-f^*_i\|^2), \qquad (12)$$

where $\gamma$ is the width of Gaussian kernel width. By using the RBF, it is always possible to find a decision function that perfectly represents a shape in a higher, possibly infinite, dimensional space. By incorporating the RBF, SVM decision function takes the form $$h(f) = \sum_{i=1}^{m} \alpha_i \exp(-\gamma\|f - f_i^*\|^2). \qquad (13)$$

The result of classification is the sign of h(f). The decision function depends on the distance between the support vectors and the data, thus normalizing the geometric $f^{1D}$ and visual $f^{2D}$ feature vectors to unit norm, as formulated in Eqns. 6 and 7, is necessary. Otherwise, higher dimensional features are favored by the SVM decision function.

In addition to the above 1D and 2D detector, a single-modal classifier, called as 1D+ detector, is also trained by SVM using only the 1D range scans to assess evaluate the discriminative power of the geometric descriptor.

Instead of the SVM classifier with radial basis function that is described above, other embodiments of the method use linear SVM, boosted classifier (AdaBoost, GentleBoost, LogitBoost), and k-NN classifiers.

It should be noted that the manner in which the joint features are obtained during off-line training and on-line detections are identical. Hence, the description of the features are obtained applies equally to both.

Detection

The training process benefits from depths. For most applications, including intelligent vehicles and robotic navigation, only depth data are available with the image. Because the speed of the object detection is another important factor, the 1D+2D detector is employed in a joint fashion that takes advantage of the depths to eliminate the unnecessary window evaluations.

To determine whether a test window depicts a person, the corresponding 1D and 2D features are determined, on the registered data. The range scan line L is aligned with the 2D image I by a perspective transformation $L_I:T(L)$ to obtain a set of image pixel coordinates $L_I=(p_1, \ldots, p_n)$ in the image.

A sliding search window $W(x, y, \delta x, \delta y)$ centered around each $p_k$ on the coordinates of $L_I$. The size (width $\delta x$ and height $\delta y$) of W is set according to the depth $d_k$ of the point $p_k$ such that for smaller depths. i.e., objects closer to the sensor, the Window size becomes larger. The window size is also proportional to the average sized person at a corresponding depth.

To further accelerate the detection process, an active set of 'candidate' window positions are used. These windows are centered on the depth data, i.e., on the range scan line $L_1=(p_1, \ldots, p_n)$. This active set of window positions is ordered from near to far based on the depth data to prioritize the detection of the important objects that would be closer to the sensor and also to successfully handle occlusions. A current window is selected and applied to the classifier from the active set of window positions. When the tested window position is classified as an object, the corresponding window positions in the active set of windows that are within the current window width $\delta x$ are removed to eliminate multiple object detections at the nearby pixel locations.

Because there is no guarantee that the LIDAR beam always intersects a specific level of the body, the vertical position y of the current window W is not fixed and multiple vertical windows at different vertical positions $y\pm\Delta y_j$ are tested for each $p_k$. As in the selection of the window size, the number of the vertical windows and their separation are determined by the depths of the center point. In this case, if $d_k$ has a large value, then a smaller vertical increments $\Delta y_j$ between multiple windows is desirable. These vertical windows are overlapping in image. The vertical window size is equal to the current window size. The joint feature for each vertical window is computed such that the geometric feature is obtained from the range scan line at the current window position and the visual feature is obtained within the vertical window region in the image.

The above method requires testing of multiple vertical windows at a current window position. Instead, a regression function that takes the visual feature as an input and estimates a vertical window position as the output can be used:

$$\Delta y = \Omega f^{2D}, \qquad (14)$$

where the regression function $\Omega$ is a row vector. This linear regression computes a vertical position $\Delta y$ from the visual descriptor that is obtained at the current window position and applied to the regression function to determine a vertical window position that is more likely to include an object. For instance, if the current window can include, the lower torso of the human, then we prefer the visual descriptor applied to the regression function to estimate a higher vertical window that contains the all body.

The classifier tests only the vertical window that is estimated by the regression function, which significantly reduces further the computational cost. The regression function can be learned from the training data of human images for the specific visual descriptor.

Within each window, the geometric descriptor $f^{1D}$ and visual descriptors $f^{2D}$ are determined, normalized, and concatenated into f. If the sign of the h(f) in the SVM classifier is positive, the person is detected by the multi-modal classifier.

In contrast to the conventional visual-only human detectors, which searches the entire image at different scales, our 1D+2D classifier reduces drastically the search space. It eliminates completely the image scaling step. Using $L_1$ helps to eliminate most of the image areas, which decreases the computational load greatly.

In practice, window evaluations can be ordered from near to far based on the LIDAR sensor depth values to determine the most critical object first.

Training Data

In supervised learning, the quality and quantity of the training data are very critical for the performance of the classifier. More training data prevents from overfitting improves generality, and enables trained models to detect possible variations of target class samples. Because our purpose is to construct an inclusive and unconstrained classifier that performs accurately without making an assumption about the range scan position on the human body, a large set of training samples is acquired for training.

However, it is cumbersome to collect such a large number of registered LIDAR and camera data, where range scans intersect different parts of human bodies. To acquire different poses, appearance variations and scan positions, the height and position of the LIDAR is be modified excessively. This is definitely a tedious and inefficient task with no guarantee of acquiring sufficient amount and quality of data.

To our advantage, it is possible to generate a high number of diverse range scans for positive and negative samples by using a depth camera that provides the 3D structure of the scene. Any number of scans can be obtained from a depth image by converting the geometric information into LIDAR-like readings synthetically. We use multi-modal human training data from 40,000 images of 450 different humans in different poses, appearance variations, lighting conditions, and shadow artifacts.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for detecting an object including a human in a scene in real time, comprising steps:
    training a classifier with joint training features extracted from training data including training one dimensional (1D) depth data acquired by a LIDAR (Light Detection And Ranging) sensor from range scans and training two dimensional (2D) texture data acquired by a camera configured to provide a three dimensional (3D) structure of the scene, so some range scans are obtained from a depth image by converting the 1D depth data into LIDAR-like readings, synthetically,
    wherein training the classifier includes integrating photometric and range scan features obtained from the 1D depth data and the 2D texture data, along with combining the 1D depth data and the 2D texture data via a geometric descriptor into a single joint feature, so as to construct the classifier that accepts unrestricted range scan positions on the object including a human body;
    determining an active set of window positions from depth data, wherein the depth data are acquired by the LIDAR sensor, such that the LIDAR sensor provides a single, horizontal, synchronously acquired range scan segment within each window and the camera provides multiple horizontal range scan segments within each window, and for each window position in the active set of window positions further comprising:
    assigning a window size from the depth data;
    selecting a current window from the active set of window positions;
    extracting a joint feature from the depth data and texture data for the current window, wherein the joint feature includes a depth feature concatenated with a visual feature, wherein the visual feature includes histograms of gradients (HOG);
    classifying the joint feature, using the classifier, to detect the object; and
    updating the active set of window positions before processing a next current window, wherein the steps are performed in a processor.

2. The method of claim 1, wherein the window positions of the active set of window positions are ordered from near to far based on the depth data.

3. The method of claim 1, wherein the current window has a nearest depth value.

4. The method of claim 1, wherein a size of the windows corresponds to an average sized person at a corresponding depth.

5. The method of claim 1, wherein the depth data are registered with the texture data.

6. The method of claim 1, further comprising:
    applying linear or bilinear interpolation to the depth data;
    subtracting a nearest depth value from the depth data; and
    setting the depth data above a human shape threshold to a maximum radius to obtain the depth feature.

7. The method of claim 1, further comprising:
    extracting the histograms of gradients from the texture data as the visual feature.

8. The method of claim 1, wherein the depth feature and the visual feature have different dimensions, and further comprising:
    normalizing the depth feature and the visual feature to a unit norm.

9. The method of claim 1, wherein the classifier uses a radial basis function kernel support vector machine (SVM).

10. The method of claim 1, wherein the classifier uses a boosted classifier.

11. The method of claim 1, further comprising:
    removing the active set window positions within the window size of the current window when the current window is classified as the object by the classifier.

12. The method of claim 1, further comprising:
    assigning multiple overlapping vertical windows for each current window, wherein vertical window sizes are equal to the current window size; and
    extracting the joint feature for each vertical window, wherein the depth feature is determined from the depth data at the current window and the visual feature is determined from the vertical window.

13. The method of claim 1, further comprising:
    applying a regression function that takes the texture data for the current window as an input and estimates a vertical window position as the output, wherein the regression function is learned from the training texture data.

14. The method of claim 1, wherein the depth data are thresholded to remove clutter.

15. The method of claim 1, wherein the classifier uses a k-NN classifier.

16. The method of claim 1, wherein the object includes one of at least one animal, at least one moving robot, at least one articulated machine, or at least one vehicle.

17. The method of claim 1, wherein the LIDAR sensor acquires training data of the object including humans, that includes different poses, appearance variations and scan positions, including varying heights of the LIDAR sensor relative to the object and varying locations of the LIDAR sensor relative to the object within the scene.

18. The method of claim 1, wherein the training data includes multi-modal human training data from 40,000 images of 450 different humans in different poses, appearance variations, lighting conditions, and shadow artifacts.

* * * * *